Figure 1:
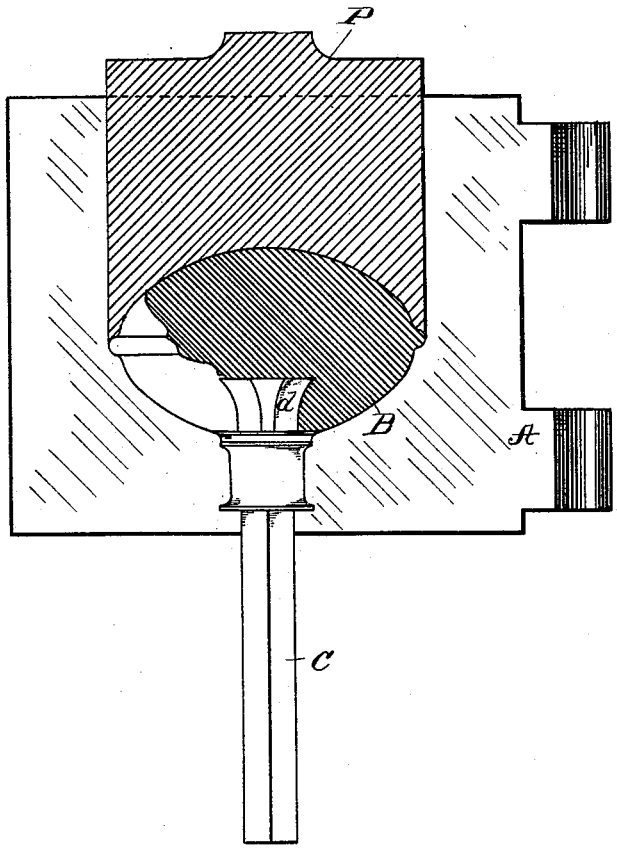

(Specimens.)

A. SWAN.
MANUFACTURE OF ARTICLES MADE OF MOLDABLE VITREOUS SUBSTANCE WITH METAL PARTS IMBEDDED THEREIN.

No. 339,822. Patented Apr. 13, 1886.

Witnesses:
C. N. Beckham
Philip Mauro

Inventor:
Alfred Swan by
A. Pollok
his attorney.

UNITED STATES PATENT OFFICE.

ALFRED SWAN, OF LOWFELL, GATESHEAD-ON-TYNE, ENGLAND.

MANUFACTURE OF ARTICLES MADE OF MOLDABLE VITREOUS SUBSTANCE WITH METAL PARTS EMBEDDED THEREIN.

SPECIFICATION forming part of Letters Patent No. 339,822, dated April 13, 1886.

Application filed January 27, 1886. Serial No. 189,966. (Specimens.)

*To all whom it may concern:*

Be it known that I, ALFRED SWAN, of Lowfell, Gateshead-on-Tyne, England, have invented a new and useful Improvement in the Manufacture of Articles Made of Moldable Vitreous Substance with Metal Parts Embedded Therein, which improvement is fully set forth in the following specification.

This invention has reference to the manufacture of articles composed partly of a castable or moldable substance similar to glass, and partly of metal embedded therein.

In the manufacture of such articles as door-knobs and the like, difficulty has been encountered in effecting a union between the two parts, it being impossible with the ordinary compositions of glass to effect such union by casting or molding the glass around the metal part, for the reason that the metal and glass expand and contract unequally under changes of temperature. For many purposes it has long been desirable to be able to embed pieces or fittings of brass, copper, or analogous base metals in some suitable substance which, like glass, can be molded under the influence of heat, and unlike glass, in that it should have substantially the same coefficient of expansion as such base metal.

I have discovered that the substance or composition known to the trade as "vitrite" is suitable for the purposes indicated. It has the following characteristics: It is vitreous, capable of being softened or melted by heat, and in such condition molded similarly to glass. It has the same coefficient of expansion as brass or copper, and can be made to have the same coefficient of expansion as other base metals. It is, further, an excellent insulator for the electric current, and upon cooling it becomes hard and glossy like glass.

Vitrite is now a well-known substance or composition, and is procurable upon the market.

By taking advantage of the peculiar property of vitrite—namely, that its coefficient of expansion is the same as that of brass, copper, or other analogous base metal—I have been able to make cheaply a great variety of useful articles.

In carrying my invention into practice I take a mold of suitable shape (and preferably of cast-iron) for the formation of the vitreous portion, and adapted to receive the pieces or articles of brass or copper to be incorporated in the vitrite. The vitrite, in a molten or plastic state, is cast into the mold and forced around the metal part or fitting, making, when solidified by cooling, a perfect connection with the latter. The coefficient of expansion of the two parts being the same, changes of temperature cannot cause the metal part by contraction to become loose, or by expansion to fracture the vitrite.

Figure 2:
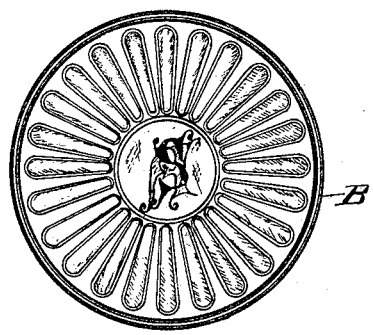

A simple example of the practice is shown by the accompanying drawings, in which Figure 1 represents in section a two-part mold, A, whose cavity and plunger together are shaped to form a door-knob, B, and Fig. 2 represents a plan of the molded article.

The mold A is provided with a suitable recess for the reception of the shank C of the knob. Said shank, which may be of suitable base metal—such as brass or copper—has suitable indentations or projections on the part which projects upwardly into the mold-cavity, as shown at *d*. The vitrite is softened or melted by heat and dropped or poured into the mold A in a manner similar to that followed in the manufacture of pressed-glass ware, having first set the shank C in its proper recess. The plunger P is then lowered and the plastic vitrite forced into all the mold-cavities and around the head of shank C. The knob of vitrite and shank of metal will contract to the same extent in cooling, so that the union of the two will be most intimate, and the shank will be tightly and securely held in place.

Although I have shown my invention as applied to a door-knob, it is obviously applicable to the manufacture of a wide range of articles, and its simplicity will enable it to be employed economically in a great variety of uses in the arts and manufactures.

I claim as my invention—

1. As a new manufacture, an article composed of the moldable vitreous substance described, having substantially the same coefficient of expansion as brass, copper, or analogous base metal, and one or more pieces of such base metal inserted or embedded directly therein in the process of molding, as set forth.

2. As a new manufacture, an article—such as a door-knob—composed of vitrite, the same being a moldable vitreous substance having substantially the same coefficient of expansion as brass or copper or analogous base metal, and having the other properties herein set forth, and one or more pieces of such base metal inserted or embedded directly therein, substantially as described.

In testimony whereof I have signed this specification in the presence of two subscribing witnesses.

ALFRED SWAN.

Witnesses:
R. Y. GREEN,
  Solicitor, Newcastle-upon-Tyne.
JASPER SMITH,
  U. S. Consul.